D. BABCOCK.
Straw Cutter.
No. 21,110.
Patented Aug. 10, 1858.
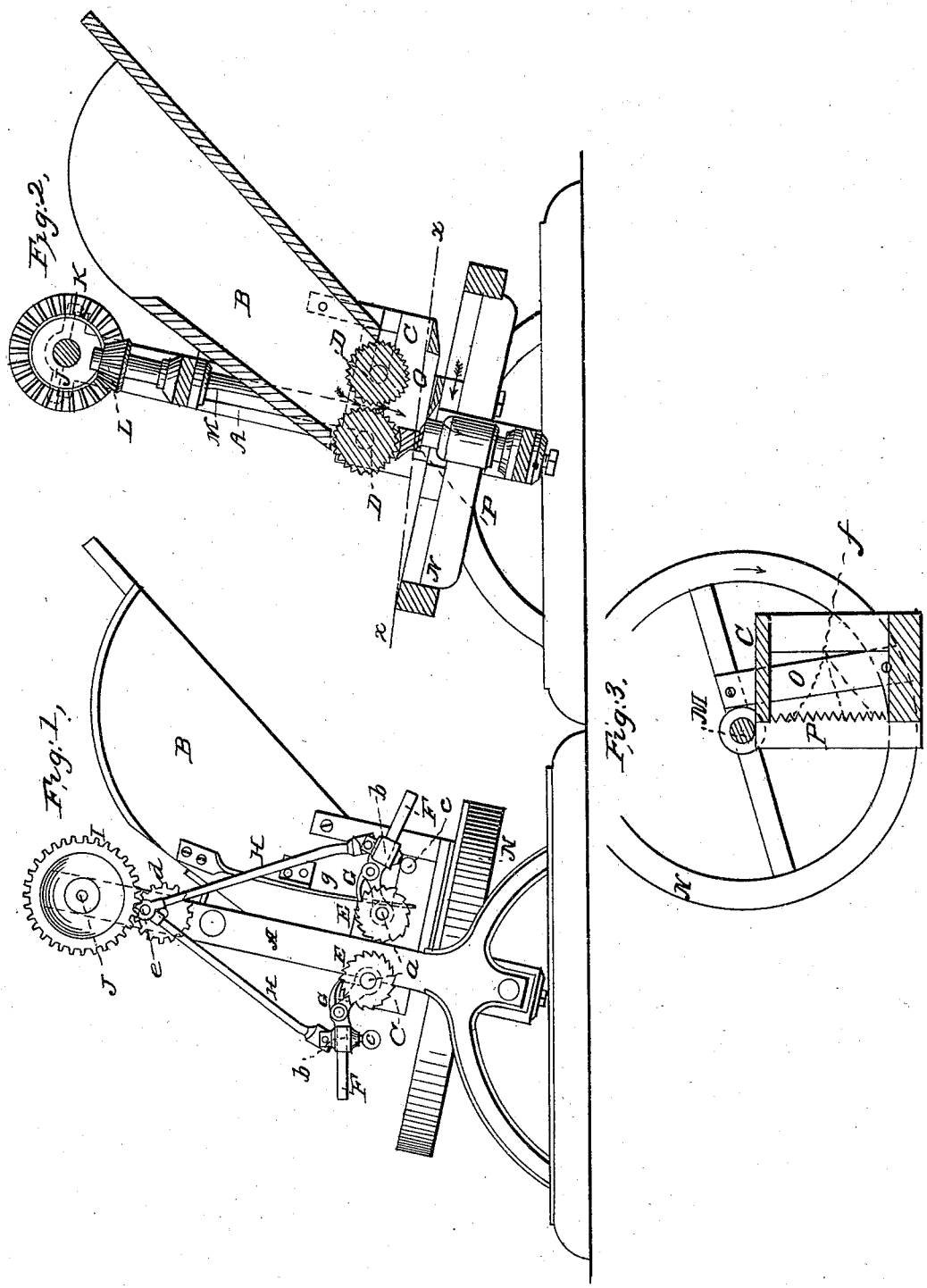

UNITED STATES PATENT OFFICE.

D. BABCOCK, OF DRYDEN, NEW YORK.

STRAW-CUTTER.

Specification of Letters Patent No. 21,110, dated August 10, 1858.

*To all whom it may concern:*

Be it known that I, DARIUS BABCOCK, of Dryden, in the county of Tompkins and State of New York, have invented a new and Improved Straw and Stalk Cutter; and I do hereby declare that the following is a full, clear, and exact description of the same, reference being had to the annexed drawings, making a part of this specification, in which—

Figure 1, is a side elevation of my invention. Fig. 2, is a side sectional view of ditto, the plane of section passing through the center of the feed box. Fig. 3, is a section of ditto, taken in the line $x, x$, Fig. 2.

Similar letters of reference indicate corresponding parts in the several figures.

This invention relates to an improvement in that class of straw, stalk and hay cutters, in which knives are attached to a rotary wheel the plane of rotation of which is at right angles with the mouth of the feed box.

The invention consists in an improved feed gear as hereinafter described, whereby the feed may be regulated as occasion may require.

To enable those skilled in the art to fully understand and construct my invention I will proceed to describe it.

A, represents a suitable framing in which a feed box B, is secured. This feed box is in an inclined position at an angle, say of from 35 to 45°. The feed box is of the usual form, may be constructed of wood and to its lower end a cast-iron frame or box C, is secured in which the bearings of feed rollers D, D, are placed, said rollers having their upper surfaces within the feed box B, as shown plainly in Fig. 2. The feed rollers D, D, are constructed of metal and are provided with corrugated peripheries and the axes or shafts $a$, of the feed rollers extend outward beyond one side of the metallic box C, and have each a ratchet wheel F, on them, said wheels having their teeth formed on them in opposite positions as shown plainly in Fig. 1.

On each axis or shaft $a$, of the feed rollers a lever F, is placed, said levers being allowed to turn or work freely on the shafts, and to each lever F, a pawl G, is attached, the pawls catching into the ratchets E. On each lever F, a sliding collar $b$, is placed, said collars being secured at any desired point by set screws $c$. To each collar $b$, a connecting rod H, is attached, and the upper end of these rods are attached to a crank wheel $d$, by one and the same pin $e$. The crank wheel $d$, gears into a wheel I, which is placed at one end of a shaft J, at the upper part of the framing A. On the shaft J, at about its center, a bevel wheel K, is placed. The wheel K, gears into a bevel pinion L, on the upper end of a shaft M, which is fitted in the framing A, and has a wheel N, on its lower end. This wheel N, as well as the framing and gearing is of cast iron and the wheel has a knife or cutter O, secured to it, the position of which is shown clearly in Fig. 3.

To the lower part of the box C, a ledger blade P, is attached. This blade is constructed of steel and has its cutting edge serrated or formed of a series of saw-shaped teeth $f$. The ledger blade P, is so arranged that the knife or cutter O, as the wheel N, rotates will pass over it as shown clearly in Fig. 2.

The framing A, and consequently the shaft M, are slightly inclined, but not so much as the feed box B, see Fig. 2. To each side of the feed box B, a spring $g$, is attached. These springs bear against the axis of one of the feed rollers, see Fig. 1.

The operation is as follows: The shaft J, is rotated either by hand or other power, and the article or material to be cut is placed within the feed box B. The article is fed by the rollers D, D, down to the knives O, P, said rollers being turned a certain distance at every revolution of the wheel N, in the direction indicated by the arrows, the distance being regulated by adjusting the collars $b$, on the levers F, so as to virtually increase or diminish their length as regards their operation and thereby cutting the material coarser or finer as may be desired. The article or material in box B, is cut at every revolution of the wheel N, the ledger blade P, owing to its serrated edge materially assisting the cutting action of the knife O. The article or material to be cut feeds itself to the rollers D, or assists itself by its gravity. The rollers therefore are greatly aided and the feed is more uniform than usual. The within described device has been practically tested and it operates well. The feeding of the article to be cut to the knife or cutter as also the cutting operation being greatly facilitated. Two knives or cutters O, may be attached to the wheel N, if desired. In this case the speed of wheel $d$, must be increased just double in order that the rollers may move twice to every revolution of the wheel N.

I do not claim a rotating cutter wheel with knives or cutters attached so arranged that the cutters work over the mouth of the feed box, for this is an old device; but,

I claim as new and desire to secure by Letters Patent—

Operating the feed rollers D, D, through the medium of the levers F, F, rods H, H, connected with said levers by means of the sliding collars $b$, pawls G, G, and crank pulley $d$, arranged substantially as herein described and for the purpose specified.

DARIUS BABCOCK.

Witnesses:
HORACE G. FITTS,
D. C. BOUTON.